March 15, 1966     C. L. JULIAN     3,240,886
LUBRICATING ARRANGEMENT FOR AN IGNITION DISTRIBUTOR
Original Filed Oct. 26, 1960
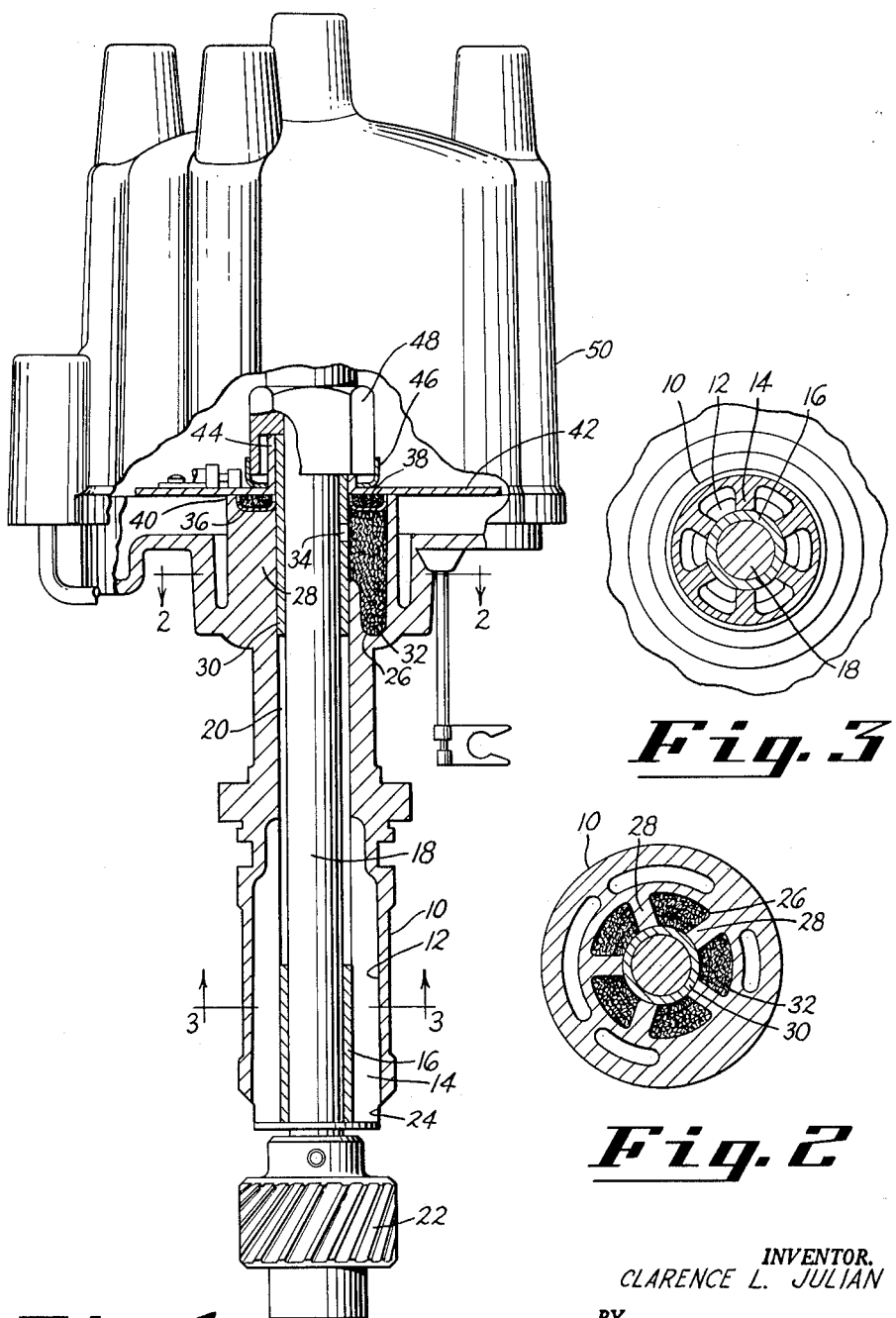
Fig.1    Fig.2    Fig.3
INVENTOR.
CLARENCE L. JULIAN
BY 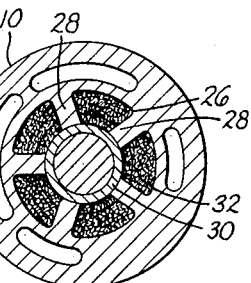
HIS ATTORNEY

United States Patent Office 3,240,886
Patented Mar. 15, 1966

3,240,886
LUBRICATING ARRANGEMENT FOR AN
IGNITION DISTRIBUTOR
Clarence L. Julian, Anderson, Ind., assignor to General
Motors Corporation, Detroit, Mich., a corporation of
Delaware
Original application Oct. 26, 1960, Ser. No. 65,069, now
Patent No. 3,162,732, dated Dec. 22, 1964. Divided
and this application Apr. 10, 1964, Ser. No. 365,225
2 Claims. (Cl. 200—30)

This invention relates to ignition distributors for internal combustion engines.

This application is a division of application S.N. 65,069, filed on October 26, 1960, now Patent No. 3,162,732.

In presently used distributors the distributor shaft is lubricated from an oil reservoir and is fed by an oiler pipe or is lubricated from a grease cup connected with the distributor base. In either case lubrication to be effective requires periodic attention in that the oiler pipe must be periodically fed with oil or the grease cup turned down and sometimes replenished with grease.

In contrast with the above described methods for lubricating distributors it is an object of this invention to provide a distributor wherein the distributor has a built in lubrication system that does not require the periodic addition of oil or grease.

Another object of this invention is to provide a distributor wherein the upper bearing of the distributor is lubricated by a permanent wicking material and wherein the lower bearing of the distributor is lubricated by engine oil.

A further object of this invention is to provide a distributor that has a base formed with pockets in its upper end that contain a permanent wicking material for lubricating a bearing, the walls of the pockets also serving to support a bearing member for the distributor shaft, the distributor base supporting another bearing at its lower end which is supported on the faces of fluted portions the grooves of which communicate with the engine when the distributor is installed on an engine.

Further objects and advantages of the present invention will be apparent from the following description, reference being had to the accompanying drawings wherein preferred embodiments of the present invention are clearly shown.

In the drawings:

FIGURE 1 is a side elevation partially in section of a distributor made in accordance with this invention.

FIGURE 2 is a sectional view taken along line 2—2 of FIGURE 1.

FIGURE 3 is a sectional view taken along line 3—3 of FIGURE 1.

Referring now to the drawings and more particularly to FIGURE 1 the distributor of FIGURE 1 has a base member generally designated by reference numeral 10 which is preferably formed of die cast aluminum material. The lower end of the base member 10 is fluted as is better shown in FIGURE 3 to provide the grooves 12 which are defined by the radial extending walls 14. The inner faces of the radial extending walls 14 contact a porous metal bushing 16 which serves as the lower bearing for the shaft 18. The shaft 18 extends through the central opening 20 formed in the distributor base and carries a gear 22 which meshes with a gear on the crank shaft of the engine with which the distributor is used. The grooves 12 communicate with the opening 20 of the upper end and are open over the areas 24 so that when the distributor is installed in an engine the grooves are open to the engine.

The upper end of the distributor base 10 is formed with pockets 26 which are defined in part by the radially extending walls 28. The inner faces of the radially extending walls 28 support a porous metal bushing 30 which serves to journal the upper end of the shaft 18. The pockets 26 are vlled with a permanent wicking material 32 which is impregnated with a lubricant that is slowly fed to the shaft through the porous metal bushing 30. The porous metal bushing may also be provided with one or two passages 34 for providing initial lubrication to the shaft 18, the other lubrication being provided at a slower rate through the porous metal bushing 30. The top open ends of the pockets or compartments 26 are closed by a lubrication seal 36 which is preferably formed of a plastic material such as nylon. The nylon part carries an annular felt washer 38.

The top end 40 of the base 10 supports a breaker or timing plate which is designated by reference number 42. The breaker plate 42 has an upstanding section 44 which is journalled on the porous metal bushing 30. A metal member 46 is attached to the breaker plate 42 and is seen that the cam 48 which is driven by the shaft 18 has a portion positioned between the member 46 and the upstanding portion 44 of the breaker plate. The breaker plate 42 carries a contact mechanism of the type shown in the patent to Julian et al. 2,816,968. As the cam 48 rotates the breaker plate contacts are opened and closed in a manner well known to those skilled in the art. The breaker plate 42 of course is connected with a suitable vacuum control assembly which shifts the plate in a manner well known to those skilled in the art.

The shaft 18 of course drives a distributor rotor having a contact that cooperates with the fixed contacts of the distributor cap 50. A suitable centrifugal advance mechanism which is not shown is also provided which varies the angular relationship between the cam 48 and the shaft 18 all of which is well known to those who are skilled in the art and which forms no part of the present invention.

It is pointed out that with the distributor of FIGURE 1 there is no oiler tube and there is no grease cup required and thus the distributor will be adequately lubricated without periodic attention by a serviceman. The permanent wicking material 32 is formed of a composition that includes cellulose fibers impregnated with a lubricant and this lubricant which is slowly fed through the porous metal bushing is sufficient to lubricate the shaft 18 at its upper end and the surface between the upstanding member 44 and the porous metal bushing 30. It thus is seen that no oiler tube is connected with the permanent wicking material 32 and none is required since the permanent wicking material together with the porous metal bushing will serve to adequately lubricate the top end of the distributor. The lower bearing 16 of the distributor is lubricated by engine oil which may be pulled up by the shaft 18 as it rotates. The engine oil also may be splashed or be conducted in vapor form through the grooves 12 to thereby provide good lubrication between the shaft 18 and the inner surface of the porous metal bushing 16. It can be seen that any lubricant pulled up by rotation of the shaft may be returned to the engine through the grooves 12. It is also apparent that any lubricant splashed up into the grooves 12 or conducted there in other ways will serve to lubricate the bearing surface between the bearing 16 and the shaft 18.

What is claimed is as follows:

1. A distributor comprising, a distributor base member having an upper end formed with a plurality of chambers defined by circumferentially spaced radially and axially extending walls, a first porous metal bushing supported by the inner faces of said radially and axially extending walls, permanent wicking material in said chambers contacting said porous metal bushing over an area of the bushing between said radially and axially extending walls, said base member having a lower fluted section providing a plurality of circumferentially spaced grooves that are open at their lower ends, a second porous metal bushing supported by walls defining said grooves, a shaft rotatably journalled in said first and second porous metal bushings, and a cam member carried by said shaft for operating a breaker contact apparatus.

2. A distributor comprising, a base member, said base member having a plurality of circumferentially spaced compartments formed in its upper end that are defined in part by radially and axially extending walls, a first porous metal bushing supported by the inner faces of said walls, permanent wicking material in said compartments engaging an outer portion of said bushing for supplying lubricant to said porous metal bushing, a breaker plate rotatably engaging on an outer surface of said porous metal bushing, said base member having a lower fluted end defining circumferentially spaced grooves, a second porous metal bushing engaging the inner faces of the walls that define said grooves, said grooves being open at their lower ends, a shaft rotatably journalled in said first and second porous metal bushings, and a cam member carried by said shaft for actuating breaker contact apparatus.

References Cited by the Examiner

UNITED STATES PATENTS

| | | | |
|---|---|---|---|
| 2,149,983 | 3/1939 | Smith | 308—72 |
| 2,223,872 | 12/1940 | McWhorter et al. | 308—26 |
| 3,027,433 | 3/1962 | Clevenger | 200—30 |
| 3,087,081 | 4/1963 | Apostoleris | 310—239 |

KATHLEEN H. CLAFFY, *Primary Examiner.*

BERNARD A. GILHEANY, *Examiner.*